United States Patent
Dong et al.

(10) Patent No.: US 10,599,611 B1
(45) Date of Patent: Mar. 24, 2020

(54) BASE OBJECT SELECTION AND CREATION IN DATA STORAGE SYSTEM MANAGEMENT

(71) Applicant: EMC IP Holding Company LLC, Hopkinton, MA (US)

(72) Inventors: Dazhi Dong, Shanghai (CN); Daniel S. Keefe, Walpole, MA (US); Xiaogang Wang, Shanghai (CN); Binhua Lu, Shanghai (CN); Xing Chen, Shanghai (CN); Chen Zhang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 211 days.

(21) Appl. No.: 15/494,999

(22) Filed: Apr. 24, 2017

(51) Int. Cl.
G06F 16/11 (2019.01)
G06F 16/13 (2019.01)
H04L 29/08 (2006.01)
H04L 29/06 (2006.01)

(52) U.S. Cl.
CPC .......... *G06F 16/122* (2019.01); *G06F 16/13* (2019.01); *H04L 67/1097* (2013.01); *H04L 69/18* (2013.01)

(58) Field of Classification Search
CPC ... G06F 16/122; G06F 16/13; H04L 67/1097; H04L 69/18
USPC ........................................................ 707/694
See application file for complete search history.

(56) References Cited

U.S. PATENT DOCUMENTS

| | | | | |
|---|---|---|---|---|
| 4,970,658 A | * | 11/1990 | Durbin | G06N 5/04 706/60 |
| 6,330,621 B1 | * | 12/2001 | Bakke | G06F 3/0617 710/5 |
| 7,093,088 B1 | * | 8/2006 | Todd | G06F 11/1415 707/999.202 |
| 7,263,590 B1 | * | 8/2007 | Todd | G06F 12/02 711/165 |
| 7,266,538 B1 | * | 9/2007 | Shatil | G06F 12/0862 |
| 7,398,284 B2 | * | 7/2008 | Sterling | H04L 41/0893 707/694 |
| 7,415,591 B1 | * | 8/2008 | Todd | G06F 3/0614 711/165 |
| 7,818,535 B1 | * | 10/2010 | Bono | G06F 12/0868 711/173 |

(Continued)

FOREIGN PATENT DOCUMENTS

WO  WO-2009054934 A1 * 4/2009 ......... G06F 21/6218

*Primary Examiner* — Phuong Thao Cao
(74) *Attorney, Agent, or Firm* — Muirhead and Saturnelli, LLC

(57) ABSTRACT

A command request may be made to create a new entity in a data storage system. The new entity may be depend upon one or more base objects required to exist prior to creating the new entity. The command request may be processed in accordance with a selected policy affecting the required base objects. The selected policy may be one of a defined set of policies affecting actions taken with respect to the required base objects and new entity. For example, the policies may provide for automatically creating the required base objects and new entity; automatically selecting existing base objects used to create the new entity; generating a command list of recommend commands for creating the required base objects and the new entity; and generating a recommend list of existing base objects and a command for creating the new entity using at least one of the existing base objects.

23 Claims, 3 Drawing Sheets

(56) References Cited

U.S. PATENT DOCUMENTS

| | | | | |
|---|---|---|---|---|
| 8,046,378 B1* | 10/2011 | Zhuge | G06F 16/122 | 707/783 |
| 8,112,661 B1* | 2/2012 | La France | G06F 11/2069 | 714/42 |
| 8,983,918 B2* | 3/2015 | Alvarez | G06Q 10/06 | 707/694 |
| 9,069,931 B2* | 6/2015 | Paris | G06F 21/00 | |
| 9,111,015 B1* | 8/2015 | Ranade | G06F 16/17 | |
| 9,158,930 B2* | 10/2015 | Paris | G06F 21/6209 | |
| 9,250,955 B1* | 2/2016 | Cox | G06F 9/4843 | |
| 9,363,150 B2* | 6/2016 | Nadgir | H04L 41/50 | |
| 9,479,585 B1* | 10/2016 | Jobanputra | H04L 67/1004 | |
| 9,507,799 B1* | 11/2016 | Goodson | G06F 16/13 | |
| 9,519,425 B1* | 12/2016 | Wood | G06F 3/0601 | |
| 9,519,696 B1* | 12/2016 | Roth | G06F 16/258 | |
| 9,817,967 B1* | 11/2017 | Shukla | G06F 21/52 | |
| 10,031,682 B1* | 7/2018 | George | G06F 3/0665 | |
| 2003/0115432 A1* | 6/2003 | Biessener | G06F 3/0601 | 711/162 |
| 2004/0230792 A1* | 11/2004 | McCarty | G06F 21/10 | 713/153 |
| 2005/0195660 A1* | 9/2005 | Kavuri | G06F 3/0605 | 365/189.05 |
| 2006/0089938 A1* | 4/2006 | Leonard | H04L 41/00 | |
| 2009/0024752 A1* | 1/2009 | Shitomi | G06F 3/0605 | 709/230 |
| 2009/0112789 A1* | 4/2009 | Oliveira | G06F 16/122 | |
| 2009/0112880 A1* | 4/2009 | Oliveira | G06F 16/13 | |
| 2009/0132605 A1* | 5/2009 | Nielsen | G06F 16/25 | |
| 2010/0011037 A1* | 1/2010 | Kazar | G06F 3/0605 | 707/E17.01 |
| 2010/0312751 A1* | 12/2010 | Anglin | G06F 11/1458 | 707/638 |
| 2011/0126207 A1* | 5/2011 | Wipfel | H04L 9/3213 | 718/104 |
| 2011/0145555 A1* | 6/2011 | Nayar | G06F 1/3203 | 713/1 |
| 2011/0219048 A1* | 9/2011 | Cross | G06F 16/00 | 707/821 |
| 2011/0246501 A1* | 10/2011 | McMenamin | G16B 50/00 | 707/769 |
| 2012/0059799 A1* | 3/2012 | Oliveira | G06F 16/13 | 707/656 |
| 2013/0041912 A1* | 2/2013 | Arora | G06F 17/2705 | 707/769 |
| 2013/0290335 A1* | 10/2013 | Ripberger | H04L 67/1097 | 707/737 |
| 2013/0332981 A1* | 12/2013 | Paris | G06F 21/00 | 726/1 |
| 2014/0025909 A1* | 1/2014 | Naor | G06F 3/0641 | 711/162 |
| 2014/0032200 A1* | 1/2014 | Zunger | H04L 67/1095 | 703/13 |
| 2014/0075495 A1* | 3/2014 | Paris | G06F 21/6209 | 726/1 |
| 2014/0207928 A1* | 7/2014 | Mesnier | H04L 41/507 | 709/223 |
| 2015/0304357 A1* | 10/2015 | Paris | G06F 21/00 | 726/1 |
| 2016/0267103 A1* | 9/2016 | Slik | H04L 67/1097 | |
| 2016/0277498 A1* | 9/2016 | Kulkarni | H04L 67/1097 | |
| 2016/0342616 A1* | 11/2016 | Wang | G06F 9/45533 | |
| 2016/0360560 A1* | 12/2016 | Jiang | H04W 76/10 | |
| 2017/0139615 A1* | 5/2017 | Olson | G06F 3/0619 | |
| 2017/0212732 A1* | 7/2017 | Kaduwela | G06F 8/34 | |
| 2017/0220586 A1* | 8/2017 | Zuckerman | G06F 21/60 | |

* cited by examiner

BASE OBJECT SELECTION AND CREATION IN DATA STORAGE SYSTEM MANAGEMENT

BACKGROUND

Technical Field

This application generally relates to automated creation and/or selection of objects such as may be used in connection with, for example, system management.

Description of Related Art

Systems may include different resources used by one or more host processors. Resources and host processors in the system may be interconnected by one or more communication connections, such as network connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. These may or may not correspond to the actual physical drives. Allowing multiple host systems to access the single data storage system allows the host systems to share data stored therein.

SUMMARY OF THE INVENTION

In accordance with one aspect of the techniques herein is a method of processing a command request comprising: receiving a management command, wherein the management command indicates a selected policy affecting actions taken in connection with execution of the management command; and performing first processing to execute the management command in accordance with the selected policy, wherein the selected policy is one of a plurality of policies. The management command may be received at a data storage system. The management command may be sent from a management application to the data storage system over a control path. The management command may be a request to create a new logical entity in the data storage system. The logical entity may be any of a file system and a file share of a file system. The plurality of policies may affect processing performed in connection with one or more base objects, wherein the new logical entity may depend upon and may require one or more other entities to exist prior to the creating the new logical entity, wherein the one or more base objects may correspond to the one or more other entities, and wherein a new object may correspond to the new logical entity. The plurality of policies may include a policy providing for automatically creating one or more new base objects corresponding to newly creating the one or more other entities, and then automatically creating the new logical entity and the new object corresponding to the new logical entity, wherein the new object may depend on and may require the one or more new base objects. The plurality of policies may include a policy providing for automatically selecting one or more existing base objects corresponding to the one or more other entities, and then automatically creating the new logical entity and the new object corresponding to the new logical entity, wherein the new object may depend on and may require the one or more existing base objects. The plurality of policies may include a policy providing for automatically generating a command list including one or more command to create the one or more other entities and one or more new base objects corresponding to the other entities, and wherein the command list may include another command to create the new logical entity and new object corresponding to the new logical entity, wherein the new object may depend on and may require the one or more base objects. The plurality of policies may include a policy providing for automatically generating a recommended command, and a recommended base object list including one or more existing base objects automatically selected, wherein the recommended command may be a command to create the new logical entity and new object corresponding to the new logical entity, wherein the new object may depend on and may require at least one of the base objects from the recommended base object list. One or more criteria may be specified for the management command, and the method may further include: determining whether storage resources are available to service the management command in accordance with the one or more criteria; and responsive to determining there are insufficient storage resources available to service the management command in accordance with the one or more criteria, returning a message to the management application indicating that there are insufficient storage resources to service the management command. The one or more criteria may include a requirement regarding performance of storage used in connection with the creating the new logical entity. The one or more criteria may affect placement of data stored on the new logical entity. The one or more criteria may indicate whether multiple tiers of storage are used for storing data of the new logical entity. The one or more criteria may indicate whether a data storage optimizer relocates data stored on the new logical entity among the multiple tiers in accordance with I/O activity directed to individual data portions. The new logical entity may be a file system and the one or more criteria may indicate whether to create the file system using a sharing protocol wherein the file system is accessible using multiple protocols.

In accordance with another aspect of techniques herein is a system comprising: a processor; and a memory including code stored therein that, when executed using the processor, performs a method comprising: receiving a management command, wherein the management command indicates a selected policy affecting actions taken in connection with execution of the management command; and performing first processing to execute the management command in accordance with the selected policy, wherein the selected policy is one of a plurality of policies.

In accordance with another aspect of techniques herein is a computer readable medium comprising code stored thereon that, when executed, performs a method of processing a command request comprising: receiving a management command, wherein the management command indicates a selected policy affecting actions taken in connection with execution of the management command; and performing first processing to execute the management command in accordance with the selected policy, wherein the selected policy is one of a plurality of policies. The management command may be received at a data storage system. The management command may be sent from a management application to the data storage system over a control path.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
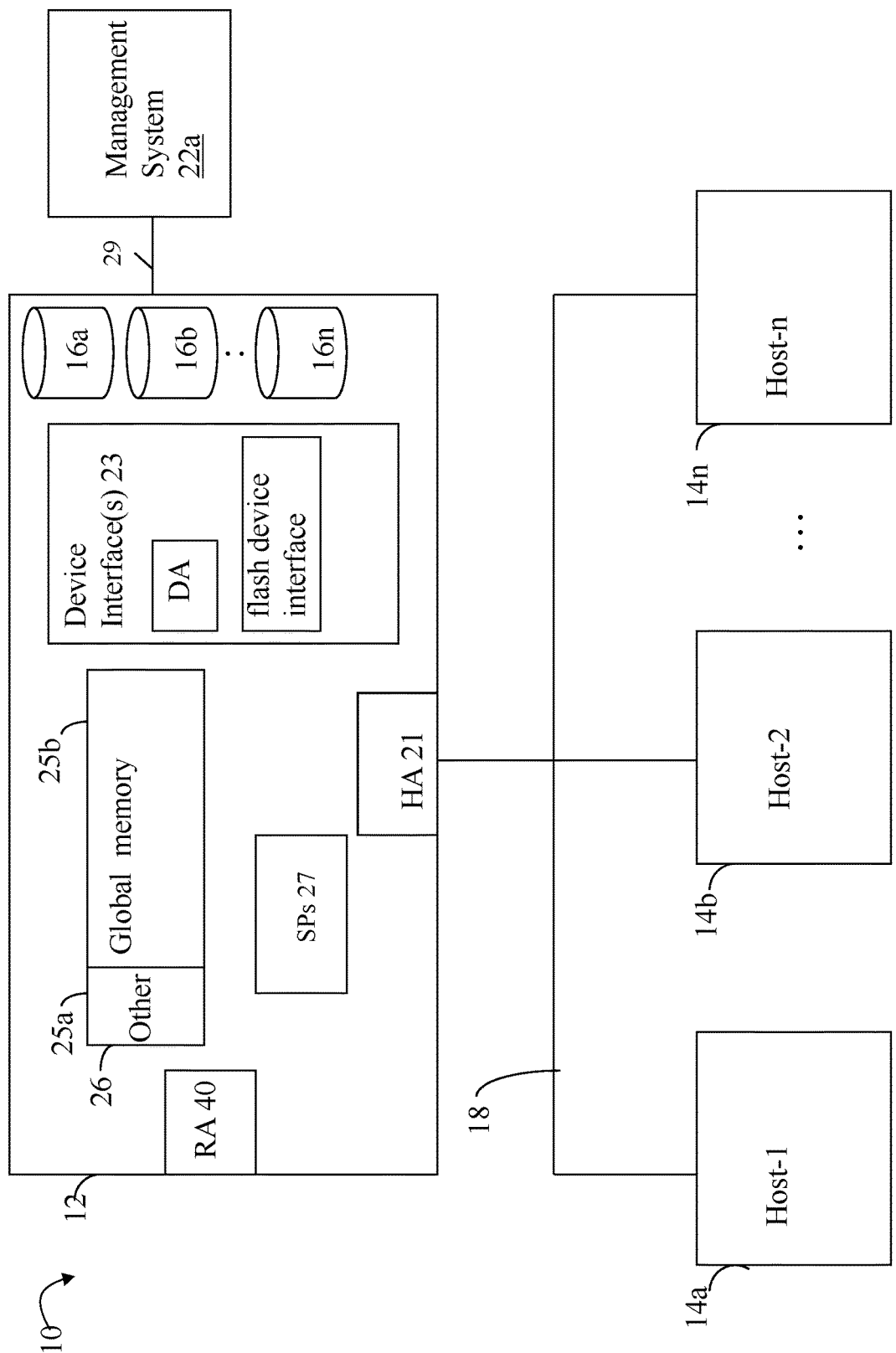
FIG. 1 is an example of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication connection 18. In this embodiment of the computer system 10, and the n hosts 14a-14n may access the data storage system 12, for example, in performing input/output (I/O) operations or data requests. The communication connection 18 may be any one or more of a variety of networks or other type of communication connections as known to those skilled in the art. The communication connection 18 may be a network connection, bus, and/or other type of data link, such as a hardwire or other connections known in the art. For example, the communication connection 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication connection 18 by any one of a variety of connections as may be provided and supported in accordance with the type of communication connection 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication connection that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication connection 18 may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of physical data storage devices (PDs or physical devices) such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. The DA which services the particular physical device may perform processing to either read data from, or write data to, the corresponding physical device location for an I/O operation.

Also shown in FIG. 1 is a management system 22a that may be used to manage and monitor the system 12. In one embodiment, the management system 22a may be a computer system, or other device as described in more detail elsewhere herein, where such system or device 22a includes data storage system management software or application such as may execute in a web browser. The system 22a may communicate with the data storage system 12 over any suitable connection 29. Generally, element 29 may be a network connection such as a public internet connection, private intranet connection, and the like. Element 29 may, for example, be any suitable connection similar to the connection 18 described elsewhere herein.

A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

Each of the different adapters, such as HA 21, DA or disk interface, RA, and the like, may be implemented as a hardware component including, for example, one or more processors, one or more forms of memory, and the like. Code may be stored in one or more of the memories of the component for performing processing.

An embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe® data storage system by EMC Corporation of Hopkinton, Mass., that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI or block-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software (e.g., the data storage system management application, also referred to herein as the management application) executing on management system 22a to the data storage system 12. Such commands may be, for example, to establish or modify data services, provision storage, perform user account management, create a new logical entity (e.g., RAID group, storage pool), view information on physical and/or logical data entities in a current data storage system configuration (e.g., status and health of physical storage devices, amount of free/available storage in a provisioned LUN, pool, or RAID group) and the like. For example, commands may be issued over the control path to provision storage for LUNs, create a snapshot, define conditions of when to create another snapshot, delete a snapshot, define or establish local and/or remote replication services, define or modify a schedule for snapshot or other data replication services, define/create a RAID group, obtain data storage management and configuration information for display, generally modify one or more aspects of a data storage system configuration, and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

In an embodiment in accordance with techniques herein, the data storage system management application or management application may support any one or more types of User interfaces (UIs) for use with techniques described herein. For example, in at least one embodiment, the management application may include support for any one or more of: a graphical UI (GUI) and command line interface (CLI). Such a GUI and/or CLI may be used by a user of the management application to issue one or more data storage system management commands or request, such as to create a new LUN whereby storage is provisioned for a new logical device or LUN. As described herein such management commands may generally include commands or requests to get or read information as well as put, write or modify information in connection with objects of a data storage system configuration. Generally, a data storage system configuration may include physical and logical entities represented by objects in data storage system configuration information. For example, physical entities may include fans, power supplies, physical storage devices (e.g., PDs, non-volatile storage media, rotating disk drives, solid state storage devices), and the like, represented by objects in the data storage system configuration information. Logical entities may include, for example, logical devices or LUNs having provisioned storage, RAID groups (e.g., groups of physical storage devices or PDs in any suitable RAID configuration known in the art such as RAID-1, RAID-5, RAID-6), storage pool (e.g., group of physical devices which may also be configured as one or more RAID groups), file server, and the like.

In at least one existing implementation not using techniques herein, a command may be issued to create a file system without specifying the base objects to use in connection with creating the file system. The management software may identify generally the types of mandatory base objects needed (e.g., pool and server object) but may not create the base objects automatically, may not tell the user how to create the base objects, and may not identify which existing base objects (if any) satisfy the file system creation command.

For example, the following first command may be input by a user using a CLI in an existing implementation not using techniques herein:

uemcli -u admin -p Password123! -d localhost /stor/prov/
   fs create -name 'fs_00' -size 3 GB -type nfs wherein the first command above may be a request to create a new NFS file system named 'fs_00' having a size of 3 GB. However, such a command may result in failure and an error message such as:

"Expected one of the following mandatory keywords:
   "-pool", "-server".
There is a syntax error in the command. Please recheck
   the command syntax. (Error Code:0x1000017)"

What will now be described are techniques that may be used in an embodiment to perform data storage system management tasks, commands and/or operations, such as typically issued by the data storage management application over the control path. In at least one embodiment, such management tasks, operations, commands, and the like, may be issued with a UI, such as a CLI or GUI, of a data storage system management application executing on a client device, such as the management system 22a. Such techniques described in following paragraphs provide for automated base object selection and/or creation. In data storage system configuration information representing a current data storage system configuration, objects may exist in a hierarchy or other relationship model where such objects represent the physical and logical entities of the current data storage system configuration.

A data storage manager or administrator may want to issue a second management command such as create a file share of a file system (FS), such as file share of a Common Internet File System (CIFS). If the manager or administrator wants to issue such a second command to create the CIFS file share, he/she needs to know which other dependent or base objects, and thus other entities in the system, need to be created prior to the CIFS file share. In other words, in connection with creating a new logical entity in the data storage system, one or more other entities and associated base objects must be in existence in order to create the new logical entity. In one aspect, the newly created logical entity and its object may be characterized as depending on one or more other entities and associated base objects. To further illustrate, consider the command to create a new CIFS file share. Such a CIFS file share is made from a CIFS file system whereby the CIFS file system must exist. Additionally in connection with the CIFS file system, a file server may also be required to exist. As known in the art, the file server may receive and service file system-based commands for one or more file systems. Additionally, storage may be provisioned from a pool or RAID group for use with the file system and file server. Thus, a pool or RAID group may also be required to exist. Thus, in connection with the foregoing to create a new CIFS file share, base objects may be required including objects representing a pool or RAID group, a file system, and a file server. Thus, prior to creating the CIFS file share, the manager may be required to initially create the pool or RAID group, the CIFS file system and the file server. As another example, if the manager want to create 1000 CIFS file shares with 100 shared per file system, and every CIFS share is 30 GB (gigabytes) in size, the manager may be required to create any base entities and corresponding objects. Furthermore, in connection with the latter example, the manager needs to perform size calculations to ensure that the underlying pool(s) providing the storage for the file systems and file shares has sufficient physical storage whereby such physical storage is of a suitable media type. Such suitable media type may, for example, require a form of high or fast performance storage media such as a flash PD if the file systems and shares will be used by applications requiring high performance storage and fast I/O response times.

Rather than require a user, such as the manager or administrator of the storage system, to perform such base or dependent entity and object creation, an embodiment in accordance with techniques herein may utilized. Described in following paragraphs are techniques that may be used to provide an intelligent way to simplify the storage system work flow to automatically create dependent or base objects, and thus create corresponding logical data storage system entities, in a dynamic customer environment. For example, in at least one embodiment, the manager may only need to issue a request or command providing inputs identifying the number of storage objects to be created, the storage object type of the objects to be created, and one or more properties of the storage objects to be created, whereby the management software will perform processing needed for additional base object selection and/or creation. In connection with base object creation, the software may perform processing needed to configure and create the additional logical data storage entities and their corresponding base objects. Such base objects automatically required and thus created as a result of initially requesting creation of a new logical entity in the command or request may be characterized as base objects upon which the new logical entity depends (e.g., new logical entity object depends upon the base objects).

Rather than create such base objects automatically, an embodiment in accordance with techniques herein may provide for automatic selection of existing logical entities and associated base objects needed to execute the request to create the new logical entity.

The foregoing and other aspects of techniques herein are described in more detail in following paragraphs.

Generally, techniques herein provide management software that may analyze end user input in accordance with one or more criteria and in accordance with a specified current policy. The one or more criteria may identify one or more requirements such as related to data storage system performance. For example, an existing QOS (quality of service) or service level agreement (SLA) may include a performance requirement for a particular application. The application may be a high performance application and the associated QOS or SLA may identify performance requirements such as an average I/O response time to be achieved with respect to I/Os directed to LUNs storing the application's data. In connection with achieving the specified QOS level or response time goal, the underlying physical storage media used in the automatically configured or automatically selected pool or RAID group configuration may flash-based storage devices (e.g., the highest performance PDs of the system). In at least one embodiment, the current policy may denote what actions are taken in connection with an issued management command where such actions may related to base object selection and creation. In at least one embodiment in connection with issue a command or request to create a new logical entity resulting in creating a new object in the current data storage system configuration, the currently selected or specified policy may be one of the following policies supported:

1. Current policy is "auto base object selection" indicating that the management application software automatically selects existing base objects, and then creates the new object for the new logical entity of the management request based on the selected base objects.

2. Current policy is "auto base object creation" indicating that the management application software automatically creates new required base objects, and then also creates the new object for the new logical entity of the management request based on the newly created base objects.

3. Current policy is "recommendation of base object selection" indicating that the management application software automatically generates a recommendation for the selected existing base objects that may be used in connection with implementing the command request (e.g., recommendation of existing base objects that may be used in connection with creating the new logical entity and its new object).

4. Current policy is "recommendation of base object creation" indicating that the management application software automatically generates a recommendation of new base objects to be created in order to implement the command request (e.g., recommendation of new base objects and associated logical entities that may be newly created and then used in connection with creating the new logical entity and its new object). The recommendation may be, for example, a sequence or series of CLI commands or a template that end user can view, modify and execute to create the base objects.

In a system where there is a base object limit or restriction, such as where required new base objects cannot be created such as due to insufficient system resources, or where there are insufficient storage resources of a required type (e.g., not enough flash storage in a particular pool), the manager or administrator issuing the management command or request to create the new logical entity that existing storage resources are not available to satisfy the provisioning requirement of the request.

In this manner, management software in accordance with techniques herein may automatically select the best resources that satisfy the customer requirements dynamically in accordance with the current data storage system configuration and currently available storage resources. In an embodiment in accordance with techniques herein, the manager or administrator issuing the request may be promptly notified as to whether the data storage system can perform the management provisioning request and how to implement or execute the provisioning request in accordance with recommendations of best practices for configuring the system to maximize any specified QOS/SLA/performance requirements. Techniques herein provide intelligent automation and implementation of data storage system commands and requests in accordance with policies to simplify provisioning work/work flow for the end user/requester. Techniques herein provide for intelligent resource management and selection for quick and reliable provisioning in accordance with best practices for configuring the data storage system.

Figure 2:
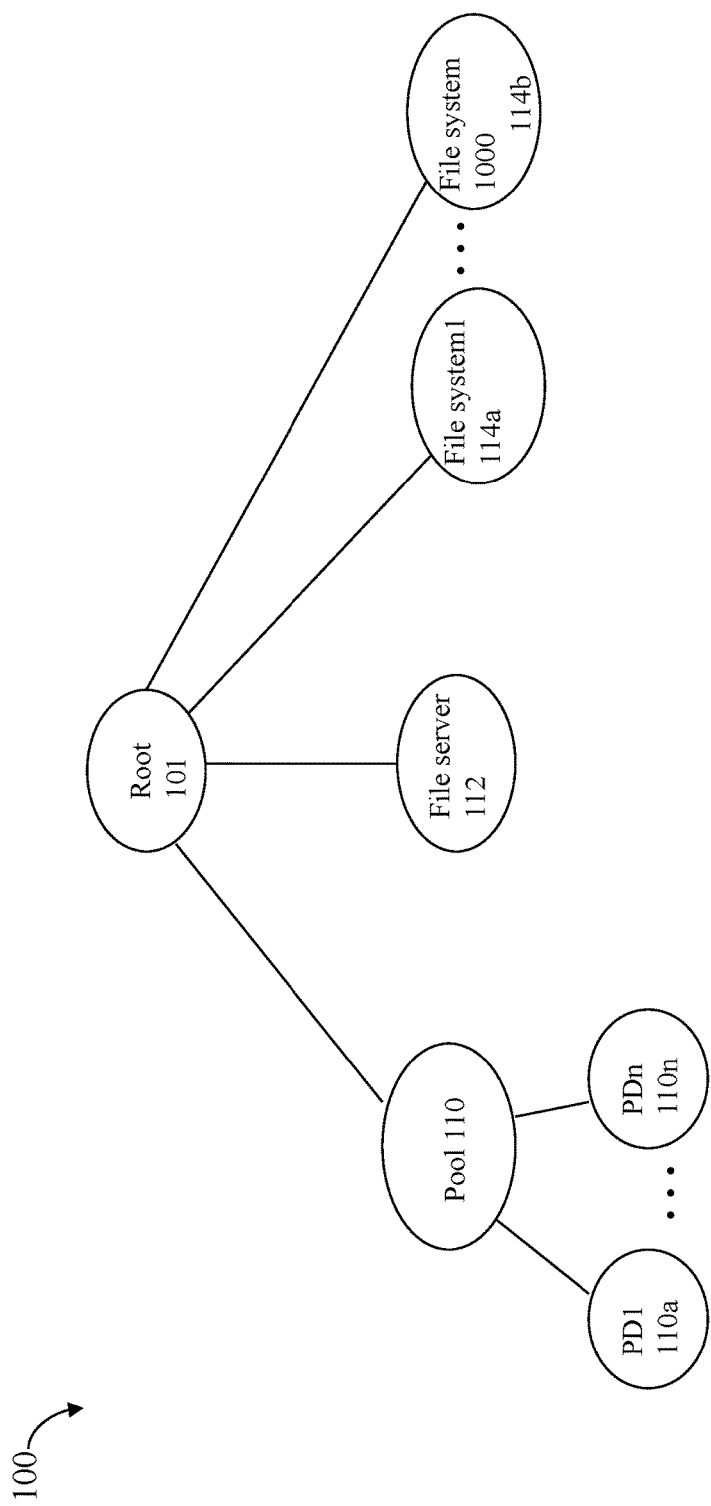
FIG. 2 is an example of objects representing a data storage system configuration that may be used in an embodiment in accordance with techniques herein.

With reference to FIG. 2, following paragraphs provide further illustration of use of techniques herein with a third command or request to create 1000 new file systems.

As a first step, the manager may issue the third command request to create 1000 new file systems including the following inputs: the storage object type is "file system", the number of new storage objects/file systems to be created is 1000, and each new file system should be 30 GB in size.

In this example, the current data storage system configuration may have no existing or configured storage pools and no existing or configured file servers. The manager may specify that the request to create 1000 new file systems is to be implemented in accordance with the policy of 'auto base object creation'. In accordance with the currently specified policy, the management software may perform processing to automatically implement and perform the provisioning request to create 1000 new file systems. In at least one embodiment, the management software may perform the following:

a. Calculate the total size or amount of required storage for the provisioning request as 1000*30 GB=30 TB.

b. Select a suitable number of PDs providing sufficient storage and create a new storage pool including the selected PDs whereby the pool has a size generally greater than 30 TB.

c. Create a new file server, such as a new NAS server.

d. Create 1000 new file systems, based on the created NAS server and the new storage pool. The new NAS server will service any file-based commands directed to the newly created 1000 file systems having their storage allocated form the new storage pool.

Referring to FIG. 2, shown is an example of objects that may be included in a data storage system configuration in an embodiment in accordance with techniques herein. The example 100 generally illustrates a hierarchical object representation of entities in a current data storage system configuration, such as after execution of the above-noted third management request creating 1000 new file systems. The example 100 is a tree-like structure including levels of nodes where each node represents an object corresponding to a physical or logical entity in the data storage system configuration. The root 101 may denote level 1 or root node. Level 2 of the hierarchy, or tree in this example includes nodes or objects 110, 112, and 114a-114b (where 114a-b denotes 1000 objects or nodes for the 1000 newly created file systems). Level 3 of the hierarchy includes nodes or objects 110a-110n, denoting N PDs in pool 110. Level 1 may denote the highest level in the tree or hierarchy with lower level objects extending further down connecting paths from the root 101 to leaf nodes or objects. The root node 101 may denote the data storage system configuration root. As known in the art, a parent node or object may have one or more child objects connected to the parent where the child may be located at a lower level than the parent. For example, root 101 is a parent with respect to its children 110, 112, and 114a-n. Pool 110 is a parent with respect to its children 110a-n. Connections between nodes or objects in the example 100 may correspond to links between parent and children. Generally, leaf nodes or objects are those having no children (e.g. 110a-n, 114a-b are leaf nodes). A path may be traversed in the hierarchy or tree from a first node or object at a first level in the tree to a second node or object at a second level in the tree where the second level is further down in the tree than the first level. A path may generally be traversed between any two nodes or objects connected by one or more levels of links where such links may also include links to other intervening nodes on the path. For example, a path may be from 101 to 110 to 110a. Another path may be from 101 to 114 to 114n.

The example 100 is one example of how objects may be included an object model of a current data storage system configuration. More generally, an embodiment may include any suitable object model and representation and is not limited to the particular example 100 shown for purposes of illustration of techniques herein.

Prior to executing and implementing the third request, the data storage system may have N PDs denoted in the object model by objects 110a-n (where N is a positive integer). Each of the PD objects 110a-n may represent a different one of the N PDs in the data storage system prior to executing the first request to create 1000 new file systems. As noted above in accordance with the currently specified policy of 'auto base object creation' for the third request, the software may automatically select PDs 110a-n for use in connection with creating a new pool denoted by object 110. Thus, the software may automatically create new object 110 in the data storage system configuration. Additionally, the software may automatically create a new file server denoted by object 112 and also automatically create new object 112 in the data storage system configuration. The software may also automatically create 1000 new file systems denotes by 1000 objects 114a-b and also automatically create the 1000 objects denoted as 114a-b in the data storage system configuration.

Thus, in connection with the third command, the base objects 110, 112, and 114a-b (1000 file system objects) may be created and thus the corresponding logical entities of those base objects also automatically created in the data storage system configuration. In this manner, the user issuing the third command does not have to perform the additional commands to create the base objects. Furthermore the user does not have to even know the particular base objects needed or required for implementing the first command. Additionally, the user does not have to worry about selecting particular PDs to be used where such PDs have sufficient storage capacity meeting the collective or total storage size requirements of at least 30 TB for all 1000 file systems. The user also does not have to worry about selecting PDs meeting any other specified requirements, such as meeting particular performance requirements as noted above. For example, the management software may automatically select and utilize PDs in the pool 110 meeting any specified performance requirements, such as selecting flash PDs if the 1000 file systems require high performance. For example, the QOS or SLA requirements may indicate that the 1000 new file systems will be used by high performance applications such as by requirements indicating "gold" or "platinum" service levels. In at least one embodiment, a number of predefined service levels may exist such as, from higher to lowest service level, platinum, gold, silver, and bronze.

The SLA for the 1000 new file systems may identify gold" or "platinum" service level requirements whereby the software may automatically require and select the highest performance media type in the system. For example, the software may require that all PDs in pool 110 may flash drives. The performance or QOS requirements may be specified in other ways such as by specifying a numeric value or range for a target I/O response time requirement such as 2-3 milliseconds for the 1000 new file systems. In this case, the management software may automatically map a specified QOS response time requirement to a particular media type such as flash drives which are expected to achieve the desired IO response time when used for I/Os directed to the file systems.

As another example illustrating use of techniques herein, consider a fourth command issued via a CLI:

uemcli -u admin -p Password123! -d localhost /stor/prov/ fs create -name 'fs_00' -size 3 GB -type nfs -auto-BaseObjCreate where the above-noted fourth command is a request create a new file system similar to as specified as described in connection with the above-noted first command. However, the fourth command noted above additionally specifies a first policy option of selection of "autoBaseObjCreate" in the CLI for automatic base object creation.

Consistent with discussion elsewhere herein, the fourth command results in the management software automatically creating a new pool (and thus new pool object), a new NAS server (and new NAS server object) and then creates the new file system based on the newly created pool and newly created NAS server (e.g., creates new file system with corresponding new file system object based on newly created NAS server object and newly created file pool object).

As another example illustrating use of techniques herein, consider a fifth command issued via a CLI:

uemcli -u admin -p Password123! -d localhost /stor/prov/ fs create -name 'fs_00' -size 3 GB -type nfs -auto-BaseObj Select where the above-noted fifth command is a request create a new file system similar to as specified as described in connection with the above-noted fourth command. However, the fifth command noted above additionally specifies a second policy option of selection of "autoBaseObj Select" in the CLI for automatic base object selection.

Consistent with discussion elsewhere herein, the fifth command results in the management software automatically selecting an existing pool and an existing NAS server having existing base objects. Such existing selected pool and NAS file system are then used in creating the new file system (e.g., creates new file system with corresponding new file system object based on selected based objects for the existing NAS server and existing file pool).

As another example illustrating use of techniques herein, consider a sixth command issued via a CLI:

uemcli -u admin -p Password123! -d localhost /stor/prov/ fs create -name 'fs_00' -size 3 GB -type nfs -auto-BaseObjCreateRecommend where the above-noted sixth command is a request create a new file system similar to as specified as described in connection with the above-noted fourth command. However, the sixth command noted above additionally specifies a third policy option of selection of "autoBaseObjCreateRecommend" in the CLI to automatically provide a recommendation of how a user may create the needed base objects used in connection with subsequently creating the new file system.

Consistent with discussion elsewhere herein, the sixth command results in the management software automatically generating a list or sequence of commands that the user may issue to create the new base objects (e.g., create new entities) and then create the new file system (and thus create the new file system object) based on the newly created entities (e.g., based on the newly created base objects).

For example, the information returned to the user by the management software from the above sixth command may be:

(1) Step 1, Create a pool using the following command: uemcli -u admin -p Password123! -d localhost /stor/config/ pool create -name 'pool_name_00' -diskGroup dg_31 -drivesNumber 5

(2) Step 2, Create a NAS server
uemcli -u admin -p Password123! -d localhost /net/nas/ server create -name "nas_server_00" -pool 'pool_name_00' -sp spa (3) Step 3, Create a file system
uemcli -u admin -p Password123! -d localhost /stor/prov/fs create -name 'fs_00' -size 3 GB -thin yes -type nfs -pool 'pool_name_00' -server 'nas_server_00'

In the above information returned for the sixth command, step 1 may be issued to create a pool named 'pool_name_00' from a RAID group of 5 PDs. Step 2 may be issued to create a NAS file server named "nas_server_00" that services file systems having storage allocated from the pool 'pool_name_00'. Step 3 may be issued to create the new file system using the base objects previously created in steps 2 and 3. In particular, step 3 may create the new file system named 'fs_00' that is a size of 3 GB where the file system is serviced by the NAS file server 'nas_server_00' and the file system has its storage in the pool name 'pool_name_00'.

As another example illustrating use of techniques herein, consider a seventh command issued via a CLI:

uemcli -u admin -p Password123! -d localhost /stor/prov/ fs create -name 'fs_00' -size 3 GB -type nfs -auto-BaseObj Select Recommend where the above-noted seventh command is a request create a new file system similar to as specified as described in connection with the above-noted fourth command. However, the seventh command noted above additionally specifies a fourth policy option of selection of "autoBaseObj SelectRecommend" in the CLI to automatically provide a command the user may issue to create the new file system using select entities and objects (automatically selected or recommended by the data storage system software).

Consistent with discussion elsewhere herein, the seventh command results in the management software automatically generating a command that the user may issue to create the new file system using selected existing base objects of existing storage system entities.

For example, the information returned to the user by the management software from the above seventh command may be:

"The following base objects correspond to existing data storage entities that may be used with the command and where such entities and objects correspond to storage resources satisfying the command:
A) Pool: pool_00, pool_01, . . . , pool_99
B) NAS Server: nas_0, nas_1, nas_9"
C) "The recommended command is:
uemcli -u admin -p Password123! -d localhost /stor/prov/ fs create -name 'fs_00' -size 3 GB -type nfs -pool pool_00 -server nas_0"

In the above information returned for the seventh command, the first portion of returned information identifies existing pools and NAS servers meet the criteria needed for the new file system and may thus be used in creating the new file system. For example, A) identifies a list of storage pools have sufficient available capacity of at least 3 GB where such pools also have physical storage meeting any performance or media requirements. B) identifies a list of servers of the desired file system type of NAS having sufficient bandwidth to service the desired NAS file system to be subsequently created. C) identifies the command that may be issued to create the new file system 'fs_00' where the selected pool from A) used is 'pool_00'; and the selected NAS file server from BO is 'nas_0'. In one aspect, C) may be characterized as a command template where a user may subsequently issue the command of C) where the user selected base objects from A) and B) are substituted into the command of C).

Additionally, the file system creation command line may identify additional properties or criteria such as one or more requirements based on QOS and SLA requirements of the newly created file system. For example, the one or more criteria affect: placement, such as initial placement, of data stored on the new file system; may affect or indicate whether multiple tiers of storage are used for storing data of the new file system; may affect or indicate whether a data storage optimizer relocates data stored on new file system among the multiple tiers in accordance with I/O activity directed to individual data portions; and the like.

In at least one embodiment, the one or more criteria denoting the QOS and SLA requirements may be identified using one or more additional command line options. For example, in at least one embodiment, the command for creating the file system command may specify a first option of:

"startHighThenAuto Fast VP tiering policy"

where the above first option indicates to initially store data of the file system on the highest-performing PDs or drives with available space, and then relocate portions of the file system's data as needed based on I/O activity.

In at least on embodiment using the above-noted first option enabled, the data storage system may include multiple storage tiers and a data storage optimizer. The data storage system may include multiple tiered storage where each such tier has a different performance relative to other tiers. Each tier may include PDs of a particular media type or technology. For example in one embodiment, storage tiers may include a first tier of flash storage devices, a second tier of 15K RPM (rotations per minute) rotating disk drives and a third tier of 10K RPM rotating disk drives. The foregoing 3 tiers may have a relative performance ranking where the first tier is the highest performance, the second tier is the middle performance and the third tier is the lowest performance. The data storage optimizer may be, for example, the FAST (Fully Automated Storage Tiering) data storage optimizer from Dell Corporation. The data storage optimizer may perform automatic placement and relocation of data portions between different storage tiers based on current I/O activity of the data portions. Thus, as the I/O activity of the individual data portions changes over time, the optimizer may automatically relocate data portions among the different tiers in efforts to optimize performance of the data storage system as a whole as well as optimize performance of particular LUNs, such as in accordance with particular performance requirements for the LUNs, an application using the data on the LUNs, a customer having data storage on the particular LUNs, and the like. For example, in a file system specifying the above option, the file system may have its data placed on multiple storage tiers managed by the data storage optimizer. The data storage optimizer may initially store data of the file system (e.g., when data is first written to the file system) on the highest performance tier, such as the first tier of flash drives, having available storage capacity. Subsequently, the data storage optimizer may then relocate data portions of the file system among different ones of the three storage tiers at later points in time as the dynamic I/O activity directed to individual data portions changes over time. For example, at a first point in time, a first set of data portions of the file system having the hottest I/O activity may be placed on flash storage of the first tier. At a second point in time subsequent to the first point in time, the I/O activity of at least one or more of the data portions may greatly decrease and thereby be demoted or relocated to a lower performance storage tier, such as the second tier of 15K RPM rotating disk drives or third tier of 10K RPM rotating disk drives. At a third point in time subsequent to the second point in time, the first set of data portions may again be very hot having very high I/O activity whereby such data portions of the first set may be promoted or relocated from the second tier of 15K RPM rotating disk drives or third tier of 10K RPM rotating disk drives to the first tier of flash drives.

In connection with the foregoing first option enabled, it should be noted that the data storage optimizer may initially store data of the file system on the highest performance tier having available storage capacity. In the above example, the first tier of flash drives may have available storage. If there is currently no available storage capacity in the first tier, newly written data to the file system may alternatively be placed initially in the second tier of 15K RPM rotating disk drives. If there is currently no available storage capacity in the second tier, newly written data to the file system may alternatively be placed initially in the third tier of 10K RPM rotating disk drives.

In at least one embodiment where the above-noted first option is disabled or is not specified, the default may be to apply or allow the storage optimizer to relocate the data of the file system among the multiple storage tiers. However, the data may not be initially stored in the highest performance tier with available storage. Rather the data's initial placement may be in a storage tier in accordance with a default policy or option. For example, the default policy may initially place the data in the lowest performance tier and then let the optimizer relocate to other tiers over time as suitable based on the data's I/O activity over time.

As yet another option and example of a QOS or SLA requirements, the command to create the file system may specify whether to enable or disable relocation among the different storage tiers by the optimizer and may also specify that data of the file system is required to be placed or stored in a particular one of the storage tiers. In this case, the pool based object may include physical storage of the particular one of the storage tiers.

As another example of a QOS or SLA requirements, the command creating the file system may specify a second option, "multi-protocol support", indicating that the newly created file system created supports multiple protocols or multi-protocol sharing. For example, if the file system is created with the multi-protocol support option enabled, file of the file system may be exported and shared among systems using different protocols. For example, file F1 in the file system may be shared and exported to multiple users on different operating systems using both the NFS (Network File System) and SMB (Server Message Block) sharing protocols (e.g., exported for use in both a Windows-based operating system and a UNIX-based operating system). As known in the art, SMB may be used, for example, with CIFS.

Generally, the above-noted options regarding multi-protocol support, "startHighThenAuto Fast VP tiering policy", specifying whether to enable or disable relocation among the different storage tiers by the optimizer, specifying that data of the file system is required to be placed or stored in a particular one of the storage tiers, and the like, may be characterized as a file system property. At least some such file system properties related to QOS, SLA and/or performance may affect the particular base objects created, selected and/or recommended in connection with the specified policy.

It should be noted that the particular way in which a particular one of the following policies is specified may be vary with embodiment. For example, as illustrated above using a CLI, each individual issued commands or requests may identify one of the four supported policies of automatically perform base object creation (e.g. fourth command above), automatically perform base object selection (e.g., fifth command above), automatically perform base object creation recommendation (e.g., sixth command above), and automatically perform base object selection recommendation (e.g., seventh command above).

Figure 3:
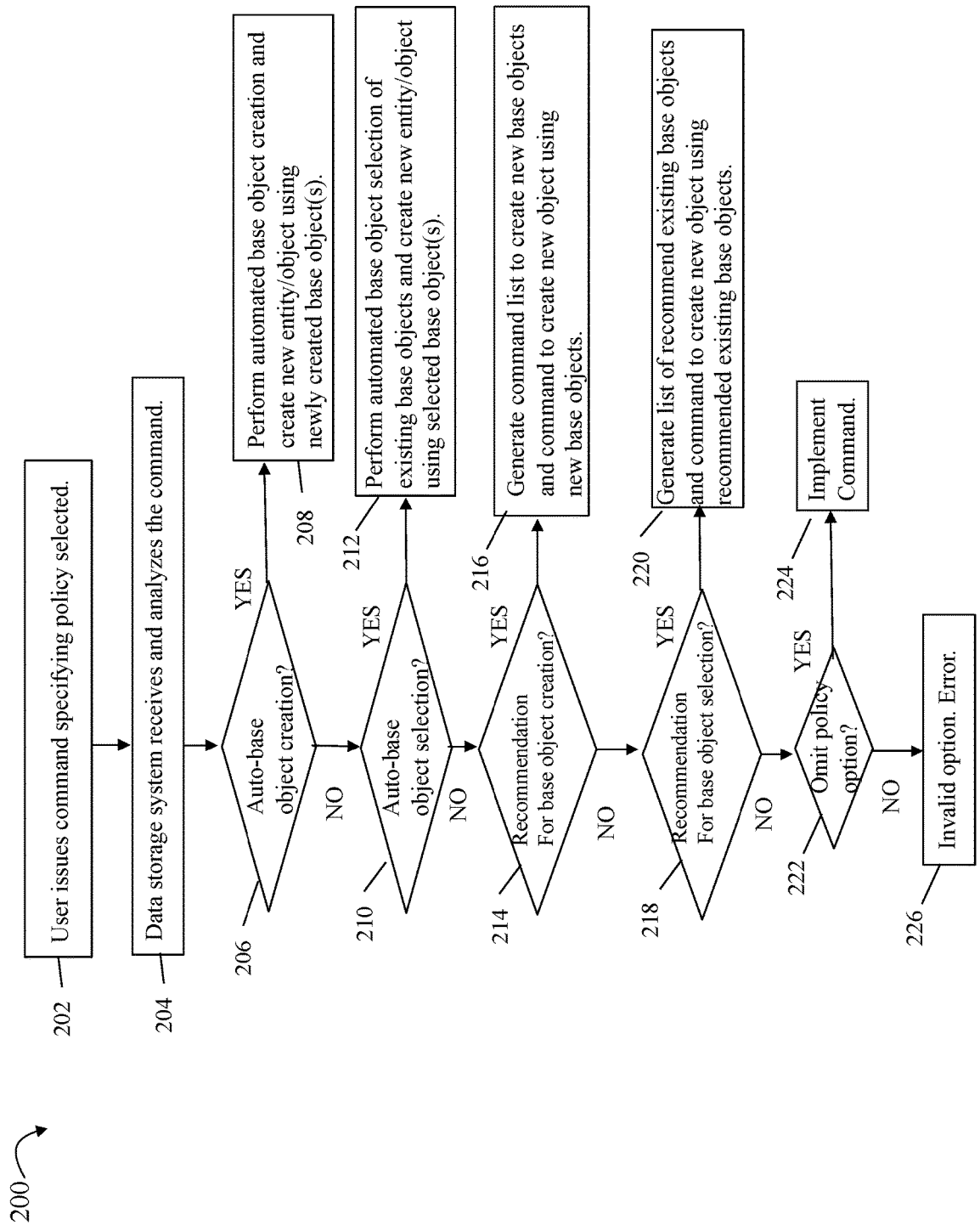
FIG. 3 is a flowchart of processing steps that may be performed in an embodiment in accordance with techniques herein.

Referring to FIG. 3, shown is a flowchart of processing steps that may be performed an embodiment in accordance with techniques herein. The flowchart 200 summarizes processing steps described above such as may be performed in an embodiment in which policy selection regarding base object may be specified for each individual management command. At step 202, the user issues a command, such as a management command to provision a new file system, a new file share, and the like. The command may specify the particular policy applied for use with the base objects needed to implement the command. At step 204, the data storage system receives the command and analyzes the command. At step 206, a determination is made as to whether the command specifies a policy for automated base object creation (e.g., fourth command above). If step 206 evaluates to yes, control proceeds to step 208 where processing is performed for automated base object creation of the one or more base objects/entities needed and then to create the new entity and object, such as for the file system or file share, using the newly created base objects. If step 206 evaluates to no, control proceeds to step 210.

At step 210, a determination is made as to whether the command specifies a policy for automated base object selection (e.g., fifth command above). If step 210 evaluates to yes, control proceeds to step 212 where processing is performed for automated base object selection to select one or more existing base objects/entities needed and then to create the new entity and object, such as for the file system or file share, using the selected existing base objects. If step 210 evaluates to no, control proceeds to step 214.

At step 214, a determination is made as to whether the command specifies a policy of recommendation for base object creation (e.g. sixth command above). If step 214 evaluates to yes, control proceeds to step 216 where processing is performed to generate a command list to create new base objects and a command to create the new entity and object using the newly created base objects. If step 214 evaluates to no, control proceeds to step 218.

At step 218, a determination is made as to whether the command specifies a policy of recommendation for base object selection (e.g., seventh command above). If step 218 evaluates to yes, control proceeds to step 220 where processing is performed to generate a list of recommended base objects and a command to create the new object using the existing base objects. Generally, the command for creating the new object in step 218 may be characterized in one aspect as a command template for use in connection with a user issuing the command to create the new entity or object. For example consider the case where the command received and analyzed in step 204 creates a file system and the policy specified is recommendation for base object selection. In this case, processing of step 220 does not actually create the file system but rather outputs a list of recommended existing base objects from which a user may subsequently select. At a later point in time, the user may issue the actual command to create the new file system using the selected existing base object(s) substituted into the command template provided in step 220. If step 218 evaluates to no, control proceeds to step 222 where a determination is made as to whether the command omits specifying any policy option. If step 222 evaluates to yes, control proceeds to step 224 where the command is implemented. Step 224 corresponds to the command that may be issued by the user without any policy option such as subsequently issuing the recommended command output in step 216 or 218 that creates the new file system. If step 224 evaluates to no, control proceeds to step 226 to issue an error since at this point processing may determine that the command received in step 204 included an invalid or undefined policy option.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing a command request comprising:
receiving a management command, wherein the management command indicates a selected policy affecting actions taken in connection with execution of the management command; and
performing first processing to execute the management command in accordance with the selected policy, wherein the selected policy is one of a plurality of policies, wherein the management command is a request to create a new logical entity in a data storage system, wherein the plurality of policies affect processing performed in connection with one or more base objects, wherein the new logical entity depends upon and requires one or more other entities to exist prior to the creating the new logical entity, wherein the one or more base objects correspond to the one or more other entities, and wherein a new object corresponds to the new logical entity, and wherein the plurality of policies includes a policy providing for automatically creating one or more new base objects corresponding to newly creating the one or more other entities, and then automatically creating the new logical entity and the new object corresponding to the new logical entity, wherein the new object depends on and requires the one or more new base objects.

2. The method of claim 1, wherein the management command is received at the data storage system.

3. The method of claim 2, wherein the management command is sent from a management application to the data storage system over a control path.

4. The method of claim 3, wherein the new logical entity is any of a file system and a file share of a file system.

5. The method of claim 3, wherein one or more criteria are specified for the management command, and the method further comprising:
   determining whether storage resources are available to service the management command in accordance with the one or more criteria; and
   responsive to determining there are insufficient storage resources available to service the management command in accordance with the one or more criteria, returning a message to the management application indicating that there are insufficient storage resources to service the management command.

6. The method of claim 5, wherein the one or more criteria include a requirement regarding performance of storage used in connection with the creating the new logical entity.

7. The method of claim 6, wherein the one or more criteria affect placement of data stored on the new logical entity.

8. The method of claim 6, wherein the one or more criteria indicate whether multiple tiers of storage are used for storing data of the new logical entity.

9. The method of claim 8, wherein the one or more criteria indicate whether a data storage optimizer relocates data stored on the new logical entity among the multiple tiers in accordance with I/O activity directed to individual data portions.

10. The method of claim 6, wherein the new logical entity is a file system and the one or more criteria indicate whether to create the file system using a sharing protocol wherein the file system is accessible using multiple protocols.

11. A system comprising:
    one or more processors; and
    a memory including code stored therein that, when executed using at least one of the one or more processors, performs a method comprising:
       receiving a management command, wherein the management command indicates a selected policy affecting actions taken in connection with execution of the management command; and
       performing first processing to execute the management command in accordance with the selected policy, wherein the selected policy is one of a plurality of policies, wherein the management command is a request to create a new logical entity in a data storage system, wherein the plurality of policies affect processing performed in connection with one or more base objects, wherein the new logical entity depends upon and requires one or more other entities to exist prior to the creating the new logical entity, wherein the one or more base objects correspond to the one or more other entities, and wherein a new object corresponds to the new logical entity, and wherein the plurality of policies includes a policy providing for automatically creating one or more new base objects corresponding to newly creating the one or more other entities, and then automatically creating the new logical entity and the new object corresponding to the new logical entity, wherein the new object depends on and requires the one or more new base objects.

12. A non-transitory computer readable medium comprising code stored thereon that, when executed, performs a method of processing a command request comprising:
    receiving a management command, wherein the management command indicates a selected policy affecting actions taken in connection with execution of the management command; and
    performing first processing to execute the management command in accordance with the selected policy, wherein the selected policy is one of a plurality of policies, wherein the management command is a request to create a new logical entity in a data storage system, wherein the plurality of policies affect processing performed in connection with one or more base objects, wherein the new logical entity depends upon and requires one or more other entities to exist prior to the creating the new logical entity, wherein the one or more base objects correspond to the one or more other entities, and wherein a new object corresponds to the new logical entity, and wherein the plurality of policies includes a policy providing for automatically creating one or more new base objects corresponding to newly creating the one or more other entities, and then automatically creating the new logical entity and the new object corresponding to the new logical entity, wherein the new object depends on and requires the one or more new base objects.

13. The non-transitory computer readable medium of claim 12, wherein the management command is received at the data storage system.

14. The non-transitory computer readable medium of claim 13, wherein the management command is sent from a management application to the data storage system over a control path.

15. A method of processing a command request comprising:
    receiving a management command, wherein the management command indicates a selected policy affecting actions taken in connection with execution of the management command; and
    performing first processing to execute the management command in accordance with the selected policy, wherein the selected policy is one of a plurality of policies, wherein the management command is a request to create a new logical entity in a data storage system, wherein the plurality of policies affect processing performed in connection with one or more base objects, wherein the new logical entity depends upon and requires one or more other entities to exist prior to the creating the new logical entity, wherein the one or more base objects correspond to the one or more other entities, and wherein a new object corresponds to the new logical entity, and wherein the plurality of policies includes a policy providing for automatically selecting one or more existing base objects corresponding to the one or more other entities, and then automatically creating the new logical entity and the new object corresponding to the new logical entity, wherein the new object depends on and requires the one or more existing base objects.

16. A non-transitory computer readable medium comprising code stored thereon that, when executed, performs a method of processing a command request comprising:
    receiving a management command, wherein the management command indicates a selected policy affecting actions taken in connection with execution of the management command; and performing first processing to execute the management command in accordance with the selected policy, wherein the selected policy is one of a plurality of policies, wherein the management command is a request to create a new logical entity in a data storage system, wherein the plurality of policies affect processing performed in connection with one or more base objects, wherein the new logical entity depends upon and requires one or more other entities to exist prior to the creating the new logical entity, wherein the one or more base objects correspond to the one or more other entities, and wherein a new object corresponds to the new logical entity, and wherein the plurality of policies includes a policy providing for automatically selecting one or more existing base objects corresponding to the one or more other entities, and then automatically creating the new logical entity and the new object corresponding to the new logical entity, wherein the new object depends on and requires the one or more existing base objects.

17. A system comprising:
one or more processors; and
a memory comprising code stored thereon, when executed by at least one of the one or more processors, performs a method of processing a command request comprising:
  receiving a management command, wherein the management command indicates a selected policy affecting actions taken in connection with execution of the management command; and
  performing first processing to execute the management command in accordance with the selected policy, wherein the selected policy is one of a plurality of policies, wherein the management command is a request to create a new logical entity in a data storage system, wherein the plurality of policies affect processing performed in connection with one or more base objects, wherein the new logical entity depends upon and requires one or more other entities to exist prior to the creating the new logical entity, wherein the one or more base objects correspond to the one or more other entities, and wherein a new object corresponds to the new logical entity, and wherein the plurality of policies includes a policy providing for automatically selecting one or more existing base objects corresponding to the one or more other entities, and then automatically creating the new logical entity and the new object corresponding to the new logical entity, wherein the new object depends on and requires the one or more existing base objects.

18. A method of processing a command request comprising:
  receiving a management command, wherein the management command indicates a selected policy affecting actions taken in connection with execution of the management command; and
  performing first processing to execute the management command in accordance with the selected policy, wherein the selected policy is one of a plurality of policies, wherein the management command is a request to create a new logical entity in a data storage system, wherein the plurality of policies affect processing performed in connection with one or more base objects, wherein the new logical entity depends upon and requires one or more other entities to exist prior to the creating the new logical entity, wherein the one or more base objects correspond to the one or more other entities, and wherein a new object corresponds to the new logical entity, and wherein the plurality of policies includes a policy providing for automatically generating a command list including one or more commands to create the one or more other entities and one or more new base objects corresponding to the one or more other entities, and wherein the command list includes another command to create the new logical entity and the new object corresponding to the new logical entity, wherein the new object depends on and requires the one or more new base objects.

19. A non-transitory computer readable medium comprising code stored thereon that, when executed, performs a method of processing a command request comprising:
  receiving a management command, wherein the management command indicates a selected policy affecting actions taken in connection with execution of the management command; and
  performing first processing to execute the management command in accordance with the selected policy, wherein the selected policy is one of a plurality of policies, wherein the management command is a request to create a new logical entity in a data storage system, wherein the plurality of policies affect processing performed in connection with one or more base objects, wherein the new logical entity depends upon and requires one or more other entities to exist prior to the creating the new logical entity, wherein the one or more base objects correspond to the one or more other entities, and wherein a new object corresponds to the new logical entity, and wherein the plurality of policies includes a policy providing for automatically generating a command list including one or more commands to create the one or more other entities and one or more new base objects corresponding to the one or more other entities, and wherein the command list includes another command to create the new logical entity and the new object corresponding to the new logical entity, wherein the new object depends on and requires the one or more new base objects.

20. A system comprising:
one or more processors; and
a memory comprising code stored thereon, when executed by at least one of the one or more processors, performs a method of processing a command request comprising:
  receiving a management command, wherein the management command indicates a selected policy affecting actions taken in connection with execution of the management command; and
  performing first processing to execute the management command in accordance with the selected policy, wherein the selected policy is one of a plurality of policies, wherein the management command is a request to create a new logical entity in a data storage system, wherein the plurality of policies affect processing performed in connection with one or more base objects, wherein the new logical entity depends upon and requires one or more other entities to exist prior to the creating the new logical entity, wherein the one or more base objects correspond to the one or more other entities, and wherein a new object corresponds to the new logical entity, and wherein the plurality of policies includes a policy providing for automatically generating a command list including one or more commands to create the one or more other entities and one or more new base objects corresponding to the one or more other entities, and wherein the command list includes another command to create the new logical entity and the new object corresponding to the new logical entity, wherein the new object depends on and requires the one or more new base objects.

21. A method of processing a command request comprising:
  receiving a management command, wherein the management command indicates a selected policy affecting actions taken in connection with execution of the management command; and
  performing first processing to execute the management command in accordance with the selected policy, wherein the selected policy is one of a plurality of policies, wherein the management command is a request to create a new logical entity in a data storage system, wherein the plurality of policies affect processing performed in connection with one or more base objects, wherein the new logical entity depends upon and requires one or more other entities to exist prior to the creating the new logical entity, wherein the one or more base objects correspond to the one or more other entities, and wherein a new object corresponds to the new logical entity, and wherein the plurality of policies includes a policy providing for automatically generating a recommended command, and a recommended base object list including one or more existing base objects automatically selected, wherein the recommended command is a command to create the new logical entity and the new object corresponding to the new logical entity, wherein the new object depends on and requires at least one of the base objects from the recommended base object list.

22. A non-transitory computer readable medium comprising code stored thereon that, when executed, performs a method of processing a command request comprising:
  receiving a management command, wherein the management command indicates a selected policy affecting actions taken in connection with execution of the management command; and
  performing first processing to execute the management command in accordance with the selected policy, wherein the selected policy is one of a plurality of policies, wherein the management command is a request to create a new logical entity in a data storage system, wherein the plurality of policies affect processing performed in connection with one or more base objects, wherein the new logical entity depends upon and requires one or more other entities to exist prior to the creating the new logical entity, wherein the one or more base objects correspond to the one or more other entities, and wherein a new object corresponds to the new logical entity, and wherein the plurality of policies includes a policy providing for automatically generating a recommended command, and a recommended base object list including one or more existing base objects automatically selected, wherein the recommended command is a command to create the new logical entity and the new object corresponding to the new logical entity, wherein the new object depends on and requires at least one of the base objects from the recommended base object list.

23. A system comprising:
  one or more processors; and
  a memory comprising code stored thereon, when executed by at least one of the one or more processors, performs a method of processing a command request comprising:
    receiving a management command, wherein the management command indicates a selected policy affecting actions taken in connection with execution of the management command; and
    performing first processing to execute the management command in accordance with the selected policy, wherein the selected policy is one of a plurality of policies, wherein the management command is a request to create a new logical entity in a data storage system, wherein the plurality of policies affect processing performed in connection with one or more base objects, wherein the new logical entity depends upon and requires one or more other entities to exist prior to the creating the new logical entity, wherein the one or more base objects correspond to the one or more other entities, and wherein a new object corresponds to the new logical entity, and wherein the plurality of policies includes a policy providing for automatically generating a recommended command, and a recommended base object list including one or more existing base objects automatically selected, wherein the recommended command is a command to create the new logical entity and the new object corresponding to the new logical entity, wherein the new object depends on and requires at least one of the base objects from the recommended base object list.

* * * * *